Aug. 27, 1940. W. E. SPARROW 2,212,867
FLEXIBLE TRANSMISSION COUPLING
Filed Nov. 18, 1938
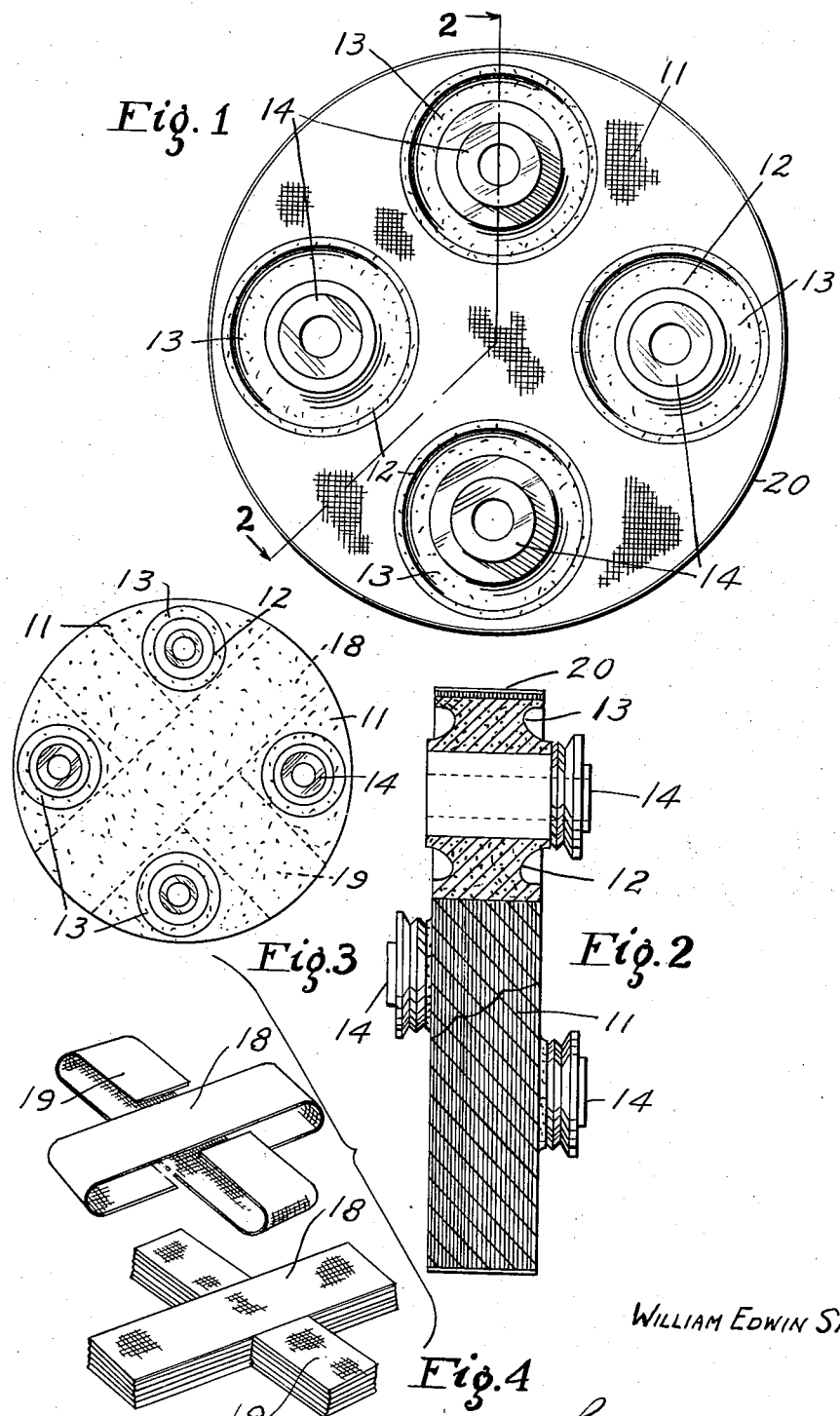
Inventor
WILLIAM EDWIN SPARROW
By Lawrence C. Witker
Attorney Patented Aug. 27, 1940

2,212,867

UNITED STATES PATENT OFFICE 2,212,867

FLEXIBLE TRANSMISSION COUPLING

William Edwin Sparrow, Birmingham, England, assignor to Spicer Manufacturing Corporation, Toledo, Ohio Application November 18, 1938, Serial No. 241,193
In Great Britain November 18, 1937

4 Claims. (Cl. 64—13)

This invention relates to flexible transmission couplings, particularly for use in the drive of a motor-vehicle, of the kind incorporating driving and driven pins endwise located in the bores of rubber bush-like portions carried by a coupling member, the pins being arranged in a circle with their axes substantially parallel to one another and the pins of one set alternating with those of the other.

British patent specification No. 29,449/37, in the name of Hardy, Spicer and Company and another, describes a coupling of this kind having the pins endwise located in the bores of the bush-like portions which are formed integrally with the rest of the coupling member, this being shown as a flexible rubber annulus having either its outer periphery or its inner periphery (or both) reinforced by a rigid member vulcanized thereto.

According to the present invention, the coupling member is in the form of a non-rigid disc, preferably formed of superposed layers of rubber-impregnated fabric vulcanized together, having holes in its supporting rubber bushes which are more flexible than the disc. (The term "rubber" is hereinafter used to include rubberized fabric and other rubber compounds.) The external periphery of the disc may be reinforced by a fabric or other non-rigid wrapping if desired.

In the accompanying drawing:

Figure 1 is an elevation of one form of coupling according to the invention;

Figure 2 is a cross section thereof, taken on the line II—II of Figure 1;

Figure 3 is another form of coupling disc which is internally reinforced; and

Figure 4 is an exploded perspective view to show the reinforcement.

In the coupling illustrated in Figures 1 and 2, superposed layers of rubber-impregnated fabric vulcanised together has four symmetrically-arranged holes for the rubber bushes 12, 12. These are preferably vulcanised in position and each has a groove 13 in each of its end faces coaxial with its bore. The associated driving or driven pins 14, 14 is preferably in the form of a flanged sleeve, as shown, which can be vulcanized in the bore of the bush.

Disposed round the periphery of the disc, so as mainly to enclose it, is a wrapping 20 of rubber-impregnated fabric vulcanized thereto.

In the modification shown in Figures 3 and 4, the disk 11, which is again of rubber, is not an annulus but is a solid disc which may or may not be fitted with an outer reinforcing ring. There is a tendency when driving for the disc to become deformed by radial expansion between the bush-like portions 12, and to prevent this use may be made of internal reinforcements consisting a diametrical fabric strips passing between adjacent pairs of the bush-like portions. In the arrangement illustrated each diametrical fabric strip 18 has its ends 19, 19 folded back on itself and spaced from one another to leave room for the adjacent diametrical strip 18 disposed at right angles thereto, and in this way these portions of the disc can be maintained to be of uniform thickness.

In this way I am able to build an inexpensive but robust coupling with which very satisfactory results can be obtained. The coupling has features in common with those of the well-known Hardy disc, but it is more robust, and in particular, fraying at the edges due to flexing is reduced. Moreover, the Hardy disc was unsuitable for use where axial displacement occurred between the driving and driven shafts, whereas such axial displacement can take place with the joint of the invention.

Having now particularly described and ascertained the nature of my said invention and in what manner the same is to be performed, I declare that what I claim is:

1. A flexible transmission coupling including driving and driven pins arranged in a circle with their axes substantially parallel to one another and with the pins of one set alternating with those of the other and a coupling member in the form of a flexible non-metallic disc having holes in it supporting rubber bushes which are more flexible than the disc and in the bores of which the pins are endwise located.

2. A flexible transmission coupling including driving and driven pins arranged in a circle with their axes substantially parallel to one another and with the pins of one set alternating with those of the other, a coupling member formed of superposed layers of rubber-impregnated fabric vulcanized together and having holes therein, and flexible rubber bushes in said holes and in the bores of which the pins are endwise located.

3. A flexible transmission coupling including driving and driven pins arranged in a circle with their axes substantially parallel to one another and with the pins of one set alternating with those of the other and a coupling member in the form of a flexible disc having holes therein, rubber bushes in said holes which are more flexible than the disc and in the bores of which the pins are endwise located, and a non-rigid wrapping for reinforcing the external periphery of the disc.

4. A flexible transmission coupling including driving and driven pins arranged in a circle with their axes substantially parallel to one another and with the pins of one set alternating with those of the other, a coupling member formed of superposed layers of rubber-impregnated fabric vulcanized together and having holes therein, flexible rubber bushes in said holes and in the bores of which the pins are endwise located, and a reinforcing wrapping on the periphery of the disc.

WILLIAM EDWIN SPARROW.